(12) United States Patent
Chen

(10) Patent No.: US 7,419,412 B2
(45) Date of Patent: Sep. 2, 2008

(54) SOLID FLOOR BOARD ASSEMBLY WITH DUCT RACEWAY CAVITY

(76) Inventor: Chih-Jung Chen, 22F, No. 106, Sec. 1, Sintai 5th Rd., Sijhih City, Taipei County (TW) 221

( * ) Notice: Subject to any disclaimer, the term of this patent is extended or adjusted under 35 U.S.C. 154(b) by 0 days.

(21) Appl. No.: 11/550,768

(22) Filed: Oct. 18, 2006

(65) Prior Publication Data
US 2008/0096400 A1 Apr. 24, 2008

(51) Int. Cl.
*E04F 15/024* (2006.01)
(52) U.S. Cl. .................. 439/925; 52/126.6; 52/263
(58) Field of Classification Search .............. 439/925; 52/126.6, 263
See application file for complete search history.

(56) References Cited

U.S. PATENT DOCUMENTS

| | | | | |
|---|---|---|---|---|
| 4,561,232 A | * | 12/1985 | Gladden et al. | 52/385 |
| 4,631,879 A | * | 12/1986 | Kobayashi et al. | 52/98 |
| 4,744,194 A | * | 5/1988 | Yasuyoshi | 52/747.11 |
| 5,052,157 A | * | 10/1991 | Ducroux et al. | 52/126.6 |
| 5,386,670 A | * | 2/1995 | Takeda et al. | 52/126.6 |
| 5,483,776 A | * | 1/1996 | Poppe | 52/220.3 |
| 5,791,096 A | * | 8/1998 | Chen | 52/126.6 |
| 6,519,902 B1 | * | 2/2003 | Scissom | 52/126.4 |
| 6,857,230 B2 | * | 2/2005 | Owen | 52/126.6 |

* cited by examiner

*Primary Examiner*—Truc Nguyen
(74) *Attorney, Agent, or Firm*—WPAT, P.C.; Anthony King

(57) ABSTRACT

A solid floor board assembly with duct raceway is composed of a plurality of base blocks, layer plates, and floor boards. A hollow cavity is formed between the base blocks and the layer plates and is partitioned to accommodate a variety of wire ducts and conduit installations neatly and orderly in desired configuration, and the surface thereof is covered with the floor boards so as to further improve the appearance of the whole structure. The solidity of structure ensures a high compressive strength, and the number of unit floor board for assembly, the size and the configuration is left to the decision of the building owner. Slip resistant stripes, flower-like striae or a picturesque pattern may be provided on the surface of the floor boards. Duct and conduit exits are provide on the surface of the floor boards for extension of wire ducts and conduit installation.

10 Claims, 10 Drawing Sheets

SOLID FLOOR BOARD ASSEMBLY WITH DUCT RACEWAY CAVITY

BACKGROUND OF THE INVENTION

1. Field of the Invention

The present invention relates to solid floor board assembly with duct raceway cavity to accommodate various ducts and conduits necessary for installation of building facilities.

2. Description of the Prior Art

Interior decoration is necessary for all buildings including factory office, residential housing and hotel etc. It is very often that those expensive floor material made of tiles of plastic, ceramic, wood, marble or even carpet have to be removed and replaced with other materials wasting a lot of money in case the owner or dweller of the building is changed so as to meet the new owner's requirement or taste. And sometimes in such cases, the partition walls must be detached or removed to a new position in order to match the new interior design requiring large amount of labor.

Modern buildings generally use assembly of layered floor board to avoid scratching its surface when moving furniture or other heavy objects, to conceal ducts and pipes, and then to apply some picturesque patterns on the floor board according to the owner's taste. However, in addition to poor quality of workmanship, the random use of primitive accessories such as tie wires and nails, the appearance of finished floor has never been satisfactory.

There has been attempts to use elevated floor board structure which preserved a sufficiently hollow cavity to conceal ducts and piping installation therein so as to maintain the interior of the building in a clean and neat appearance. But such floor board design inducted an in negligible problem of noisy echoing sound fed back from the cavity underneath the floor.

For these defects noticeable on the prior art, an improvement is seriously required. The applicant has plunged into this matter for years to studying and rectifying these defects and has came up with a novel solid floor board assembly with duct raceway cavity as provided in this invention to eliminate the defects mentioned above.

SUMMARY OF THE INVENTION

Accordingly it is an object of the present invention to provide a solid floor board assembly with duct raceway cavity which is able to neatly and orderly dispose building ducts and piping equipment in the cavity preserved, in the hollow cavity under the floor.

It is another object of the present invention to provide a solid floor board assembly with duct raceway cavity which is clean and neat in appearance and also can be easily assembled.

It is yet another object of the present invention to provide a solid floor board assembly with duct raceway cavity in which the raceways can be extended in all directions.

To achieve the aforesaid objects, the floor board of the present invention comprises a plurality of base blocks, a plurality of layer plates, and a plurality of floor boards.

Each base block includes four stubs erected at its four corners which can be fabricated in one piece with the base block, and a recess is formed at the surface of each stub.

Each layer plate being interposed on the base block among four stubs to form into a cross-bar configuration and split into a desired layout route along several frangible creases prepared on the layer plate.

Each floor board is provided with a plurality of posts to be inserted into the corresponding recesses formed on the stubs of the base block in the form of tenon and mortise joint.

A hollow cavity formed between the base blocks and the layer plates are partitioned to accommodate a variety of wire ducts and conduit installations neatly and orderly, and the surface thereof is covered with the floor boards so as to further improve the outer look of the whole structure. The solid structure enhances its compressive strength, the number of unit floor board for assembly and the size and configuration thereof can be decided by the owner. Several duct exits are provided on the surface of the floor board assembly to allow extension of the raceway in any direction.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 1:
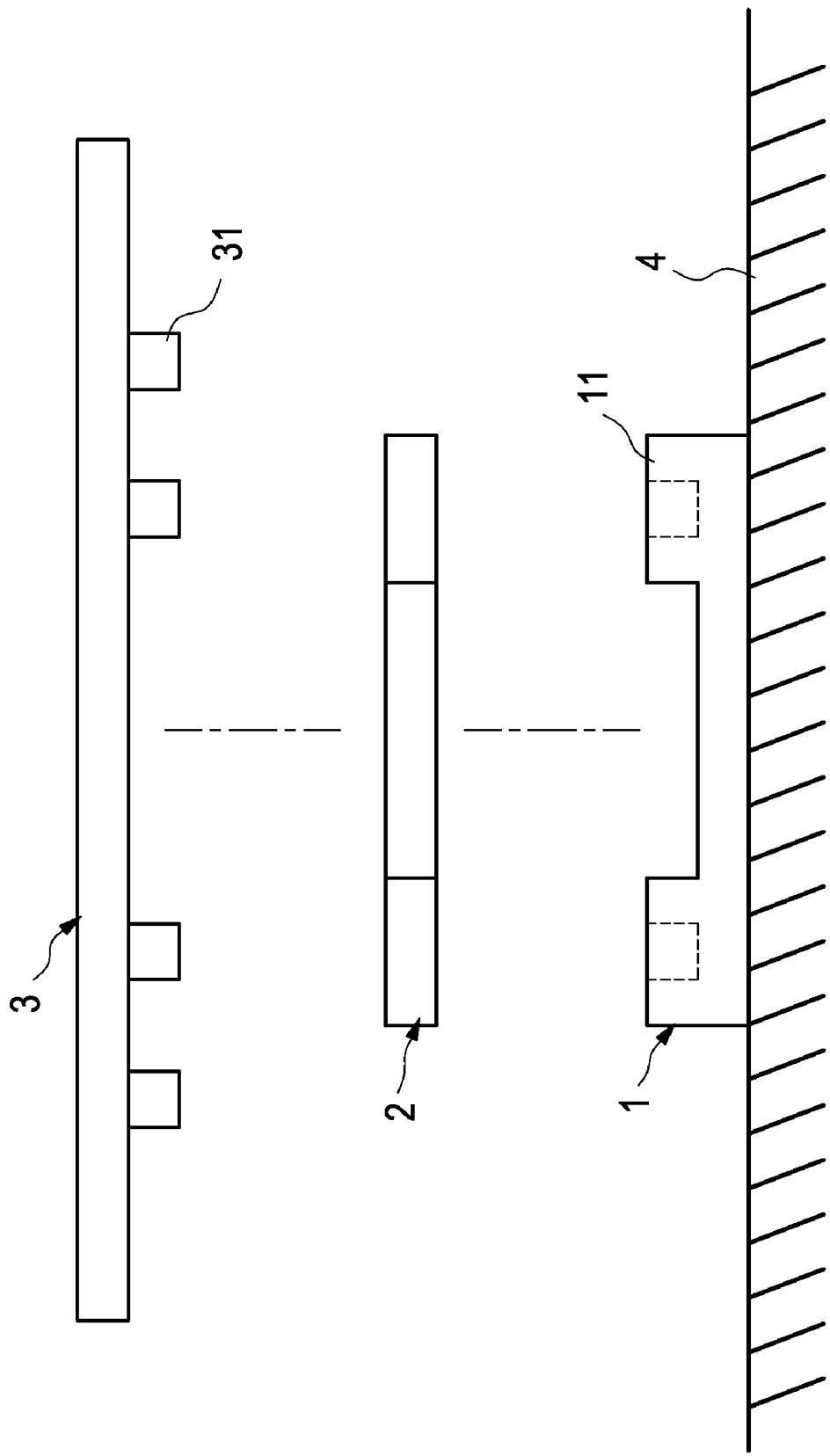
FIG. 1 is an exploded view of one unit piece of the solid floor board assembly with duct raceway cavity according to the present invention.

Referring to FIG. 1, which is an exploded view showing one unit piece of the present invention. The solid floor board assembly with duct raceway cavity is composed of a plurality of unit base block 1, unit layer plate 2, and unit floor board 3.

Figure 2:
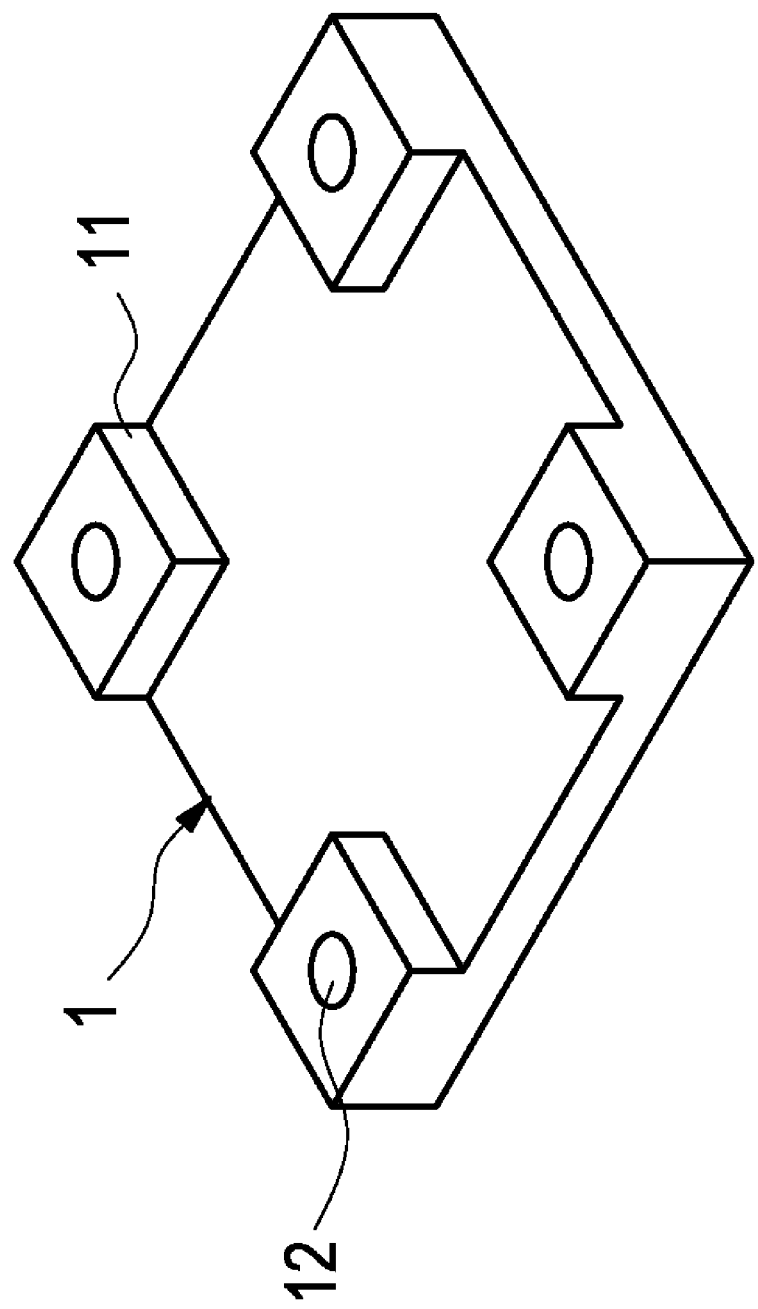
FIG. 2 is a perspective view of the base block of the present invention.
Figure 3:
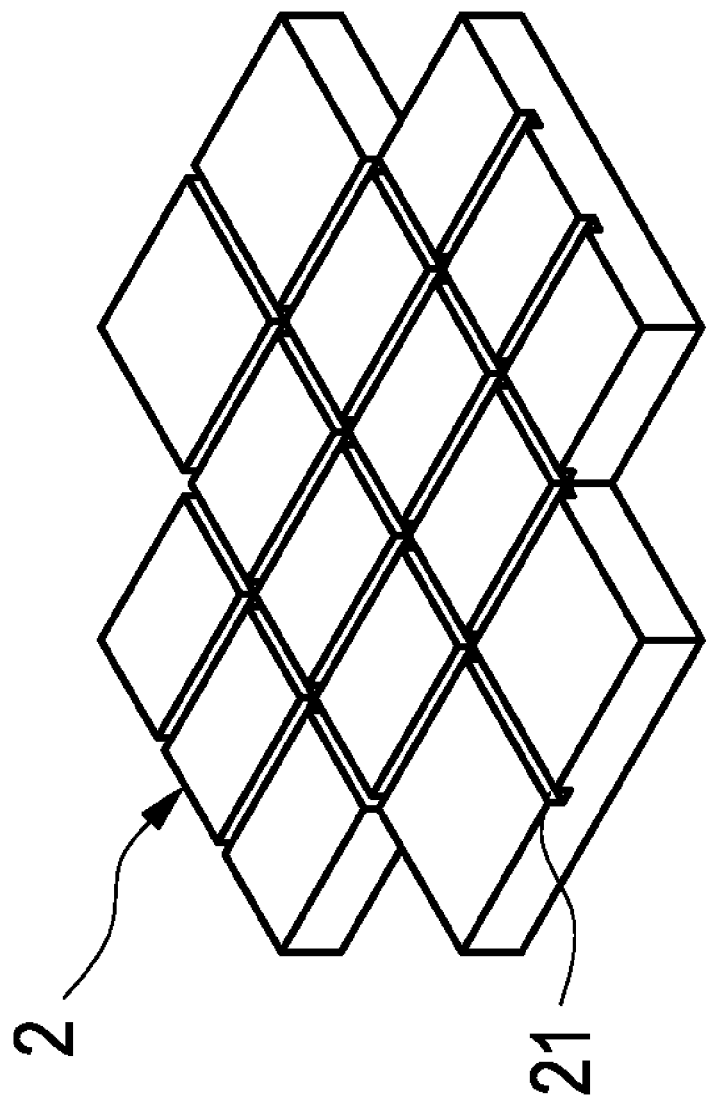
FIG. 3 is a perspective view of the layer plate of the present invention.

FIG. 2 and FIG. 3 are the perspective views of the base block and the layer plate respectively. Each base block 1 is provided with four stubs 11 at four corners thereof, and a recess 12 is formed on the top surface of each stub 11. The layer plate 2 is entrained on the base block 1 among four stubs 11 and can be formed into any desired configuration so as to partition the cavity between the base block 1 and the layer plate 2 in the transverse and longitudinal direction. The base block 1 is firmly sustained on the ground with screws, two-faced binder, liquid binder, or nails.

Figure 4:
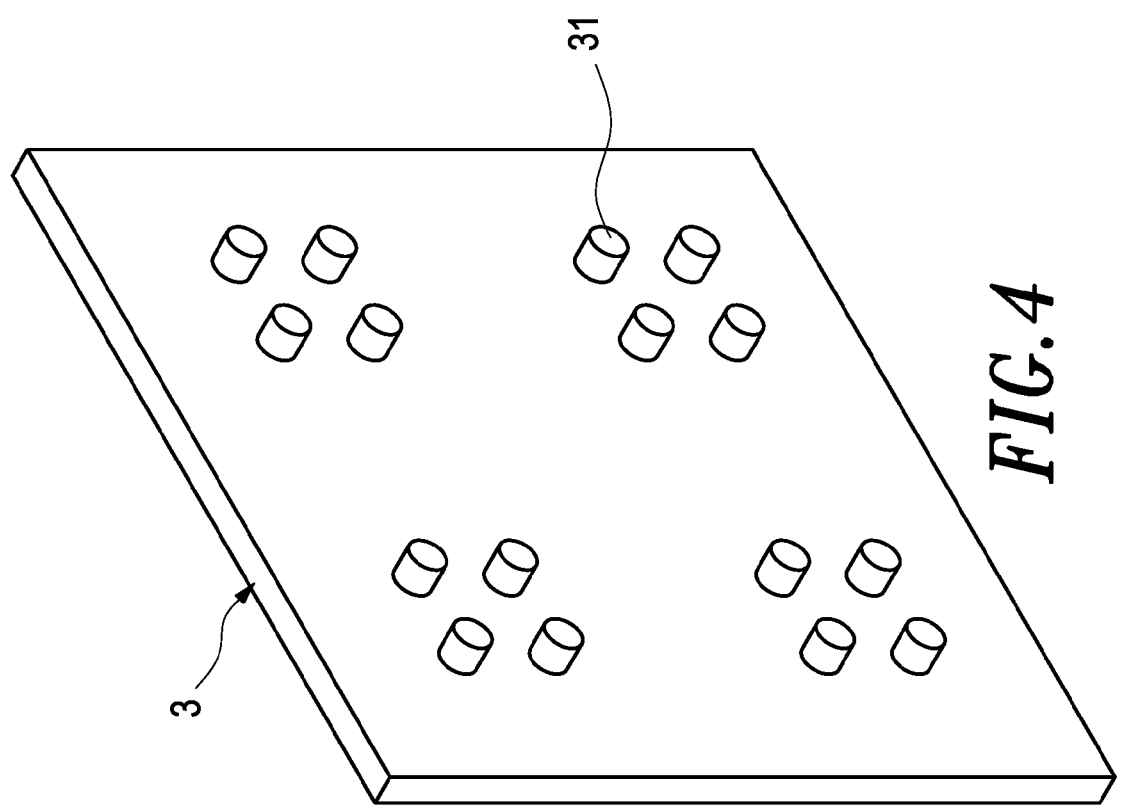
FIG. 4 is a perspective view of the floor board of the present invention.
Figure 5:
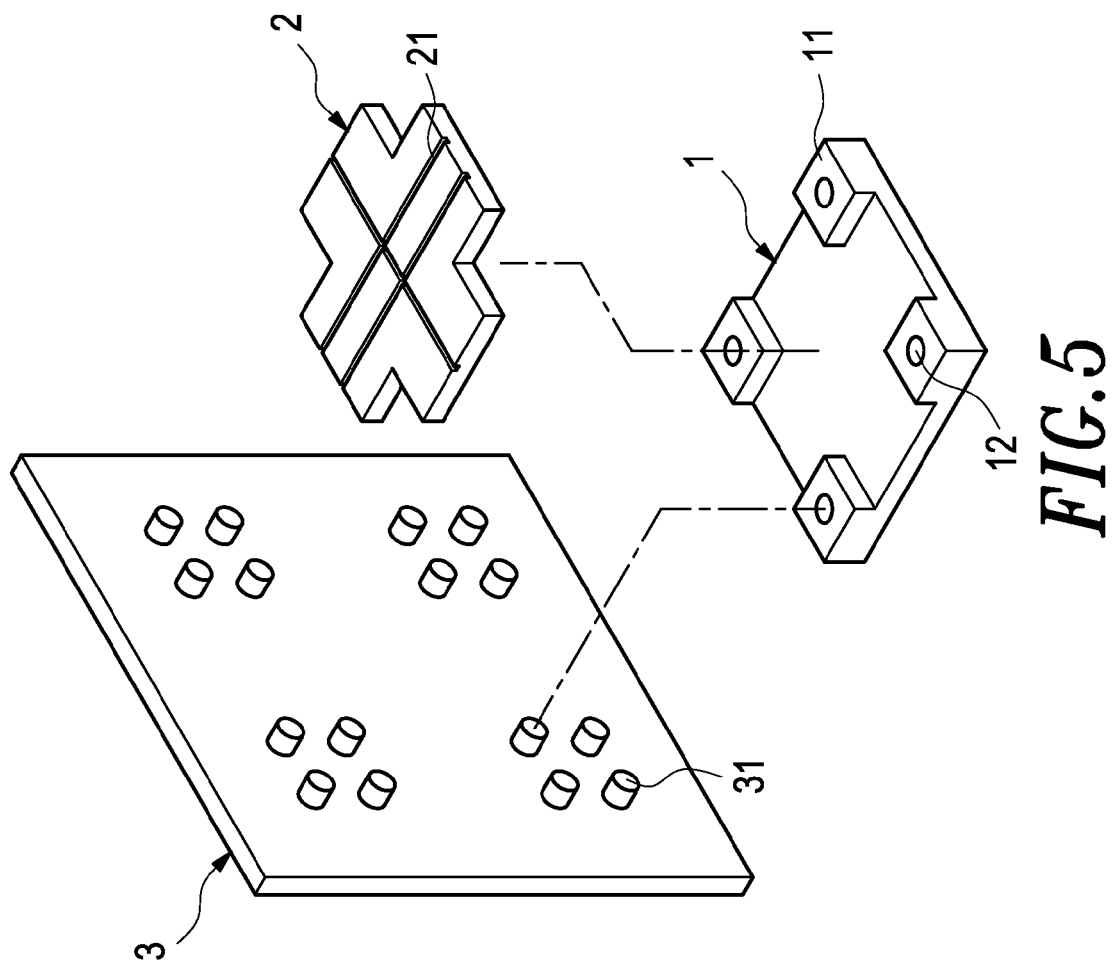
FIG. 5 is an exploded view for illustrating the structural relation among the component parts of the present invention.
Figure 6B:
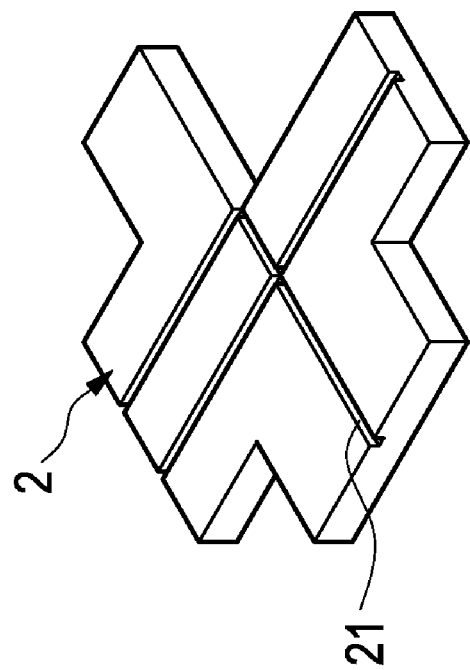
FIG. 6A to FIG. 6F show six variation patterns of the layer plate according to the present invention.
Figure 6A:
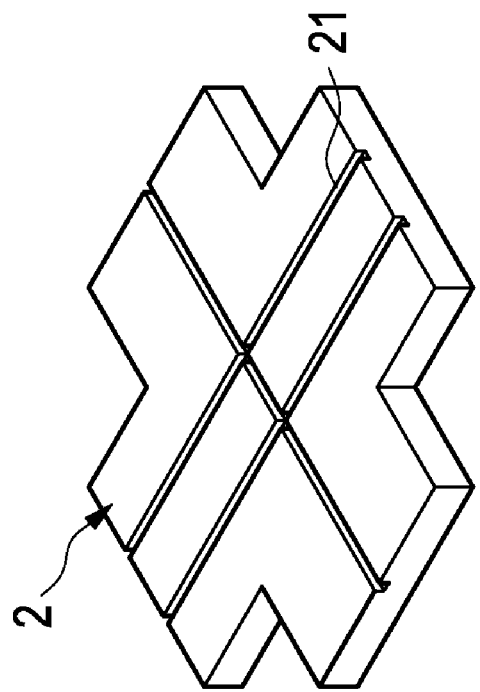
Figure 6D:
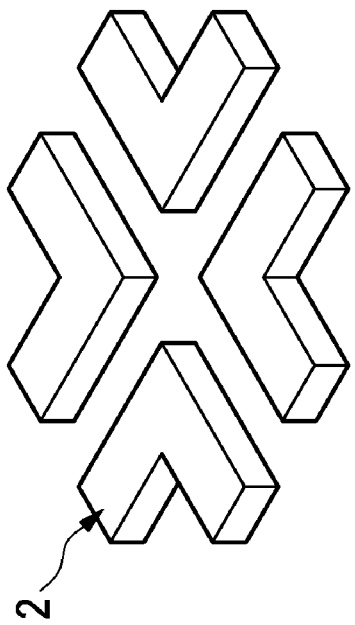
Figure 6C:
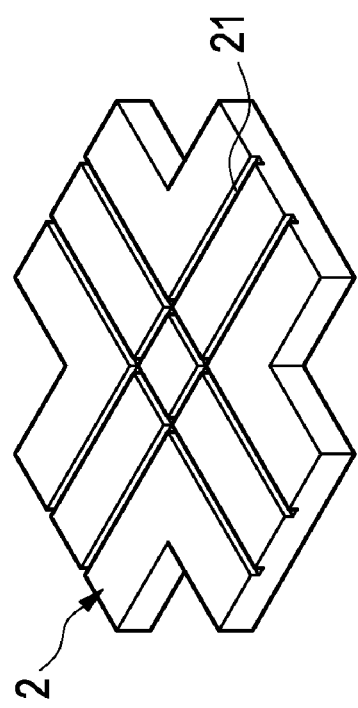
Figure 6F:
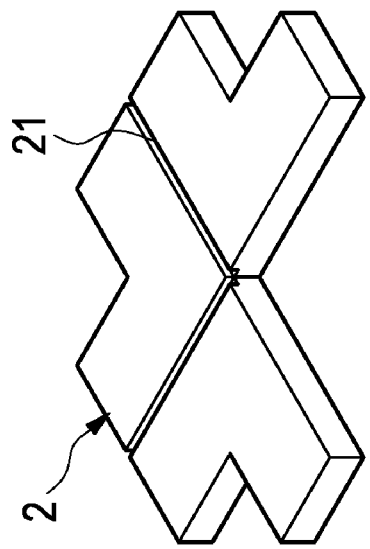
Figure 6E:
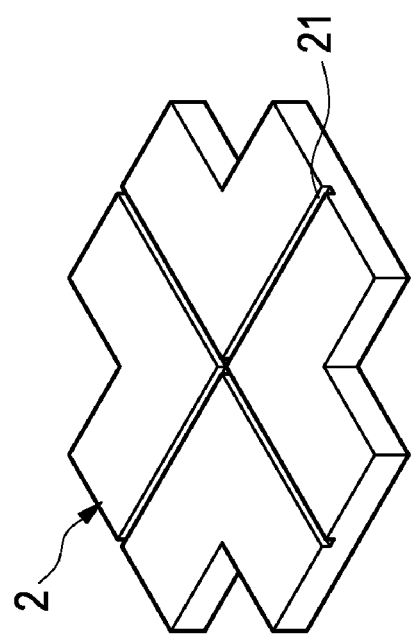

FIG. 4 is a perspective view of the floor board, and FIG. 5 is an exploded view for illustrating the structural relation among the component parts according to the present invention. There are a plurality of posts 31 erected on the surface of the floor board 3 to be inserted into the corresponding recesses 12 formed on the stubs 11 of the base block 1 in the manner of detachable tenon and mortise joint without the need of any tools therefore completing a structure of solid floor board assembly with duct raceway cavity.

FIG. 6A to FIG. 6F show six variation patterns of the layer plate, such a variation can be accomplished by scraping several frangible creases 21 on the layer plate 2 and split the layer plate 2 along the creases 21.

Figure 7:
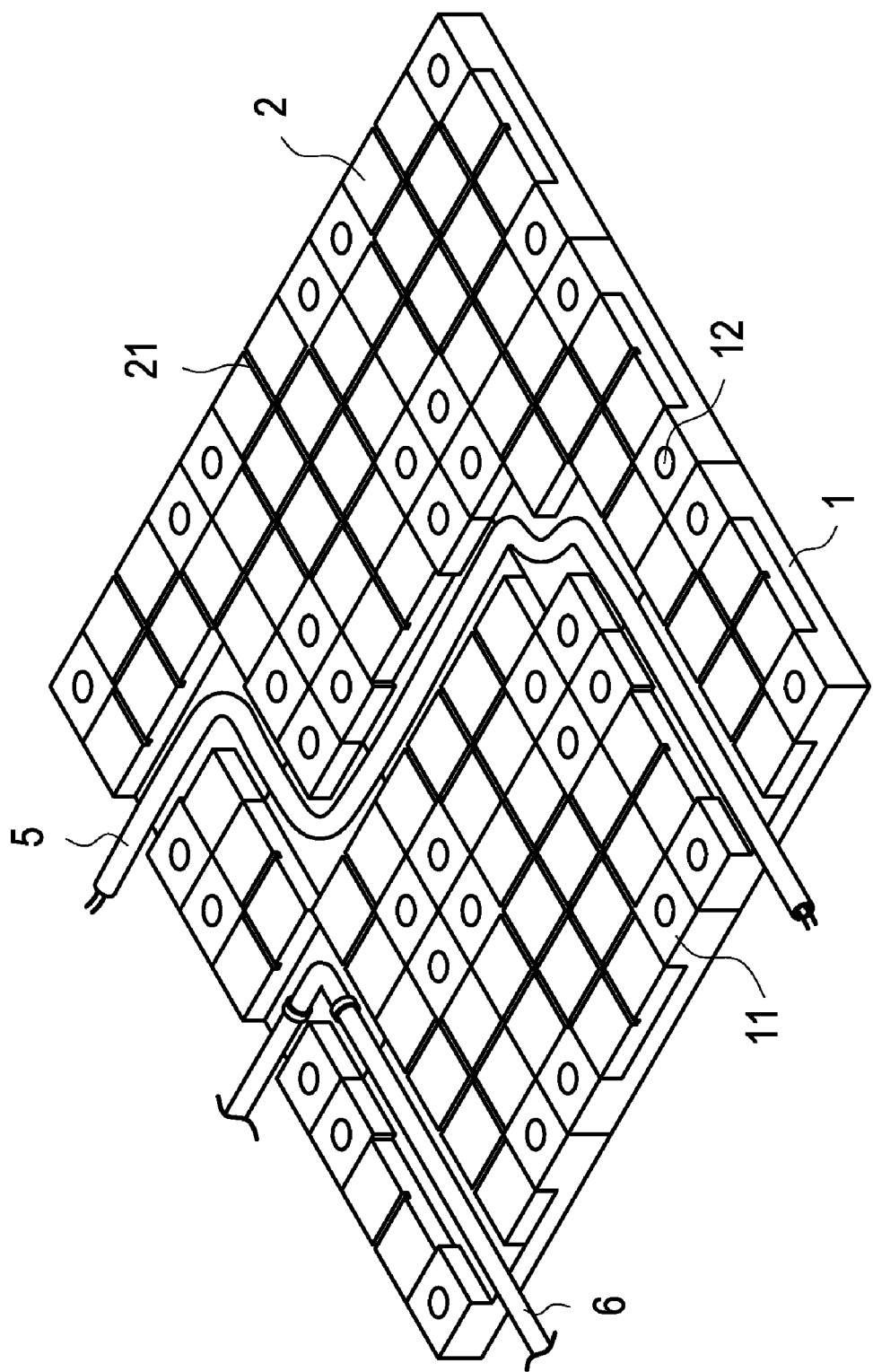
FIG. 7 is an exemplary perspective view of the present invention.

FIG. 7 is an exemplary perspective view of the present invention, here, the layer plates 2 are split along the frangible creases 21 to make a desired layout passage for a wire duct 5 or cold/hot water pipes 6 in the cavity.

Figure 8:
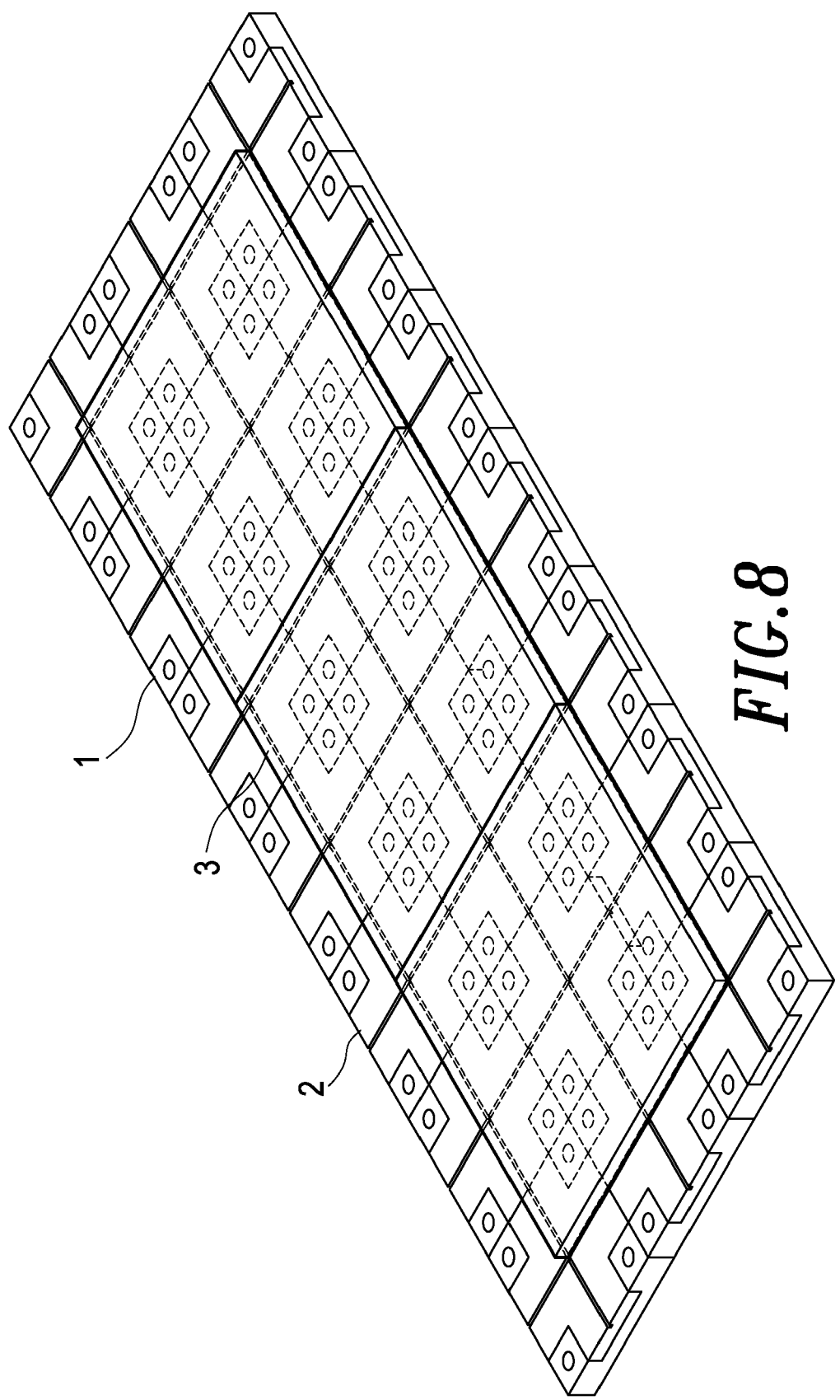
FIG. 8 is a perspective view of a completed structure of the present invention.

FIG. 8 is a perspective view of a completed structure of the present invention, what the observer can see is a clean and neat surface of the floor board 3. For enhancing the security of the dwellers, the surface of the floor boards 3 can be provided with slip resistant striae. Besides, a variety of flower-like stripes or picturesque patterns may be formed on the surface of the floor boards 3.

For extension of the wire ducts 5 and cold/hot water pipes 6 in any direction, one or more than one duct and pipe exit may be provided on the surface of the floor boards 3.

It is understood that the present invention is a high level technical creation and by no means, simply utilizes conventional technology or knowledge known prior to the application for patent, or can easily be made by persons skilled in the arts. Prior to the application for patent, the invention has neither been published or put to public use, nor displayed in an exhibition. Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A solid floor board assembly with duct raceway cavity comprising:

a plurality of base blocks each including four stubs erected at its four corners, and which being fabricated in one piece with said base block, and a recess being formed at the surface of each said stub;

a plurality of layer plates each being entrained on said base block among said four stubs to form into a cross bar configuration and split into a desired layout direction along several frangible crease prepared on said layer plate; and a plurality of floor board each provided with a plurality of posts to be inserted into the corresponding recesses formed on said stubs of said base block in the form of tenon and mortise joint;

wherein a hollow cavity formed between said base blocks and said layer plates are partitioned to accommodate a variety of wire ducts and conduits for respective usage neatly and orderly, and the surface thereof is covered with said floor boards so as to further improve the outer look of the whole structure, the solidarity of structure ensures a high compressive strength, and the number of unit floor board for assembly, the size and the configuration thereof is left to the decision of the building owner.

2. The solid floor board assembly of claim 1, wherein the layout route and size of said cavity formed between said base block and said layer plate is adjustable to fit the actual needs.

3. The solid floor board assembly of claim 1, wherein one or more than one duct and conduit exit is provided on the surface of said floor boards for extension of the wire ducts and other conduit installations.

4. The solid floor board assembly of claim 1, wherein said base block is fixed to the ground with a two-face binder.

5. The solid floor board assembly of claim 1, wherein said base block is fixed to the ground with nails.

6. The solid floor board assembly of claim 1, wherein said base block is fixed to the ground with a liquid binder.

7. The solid floor board assembly of claim 1, wherein said floor board is fixed to the ground with screws.

8. The solid floor board assembly of claim 1, wherein said floor board is provided with slip resistant stripes on its surface.

9. The solid floor board assembly of claim 1, wherein said floor board is provided with beautified flower-like striae on its surface.

10. The solid floor board assembly of claim 1, wherein said floor board is provided with a beautified picturesque pattern on its surface.

* * * * *